United States Patent
Tsai et al.

(10) Patent No.: US 8,441,376 B1
(45) Date of Patent: May 14, 2013

(54) SYSTEM, MODULE, AND METHOD FOR PRESENTING SURFACE SYMBOLOGY ON AN AIRCRAFT DISPLAY UNIT

(75) Inventors: Hung-i B. Tsai, Cedar Rapids, IA (US); Benjamin J. Helppi, Cedar Rapids, IA (US); Raymond P. Roland, Oakville, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 321 days.

(21) Appl. No.: 12/893,243

(22) Filed: Sep. 29, 2010

(51) Int. Cl.
*G08B 21/00* (2006.01)

(52) U.S. Cl.
USPC ................. 340/959; 73/178 T; 701/15

(58) Field of Classification Search .......... 340/959, 340/971, 963, 945; 701/9, 14, 15; 73/178 T
See application file for complete search history.

(56) References Cited

U.S. PATENT DOCUMENTS

| | | | | |
|---|---|---|---|---|
| 3,128,445 A | * | 4/1964 | Hosford | 340/959 |
| 4,251,868 A | * | 2/1981 | Aron et al. | 701/15 |
| 5,499,025 A | * | 3/1996 | Middleton et al. | 340/959 |
| 6,175,315 B1 | * | 1/2001 | Millard et al. | 340/959 |
| 6,822,624 B2 | | 11/2004 | Naimer et al. | |
| 2009/0125168 A1 | * | 5/2009 | Voisin | 701/15 |

OTHER PUBLICATIONS

U.S. Appl. No. 12/217,458, filed Jul. 3, 2008, Inventor: Chiew et al.
U.S. Appl. No. 12/822,660, filed Jun. 24, 2010, Inventor: Barber et al.

* cited by examiner

*Primary Examiner* — Brent Swarthout
(74) *Attorney, Agent, or Firm* — Donna P. Suchy; Damiel M. Barbieri

(57) ABSTRACT

A present novel and non-trivial system, module, and method for presenting surface symbology on an aircraft display unit are disclosed. Symbology image data representative of an image depicting takeoff distance symbology is generated by a symbology generator based upon flight management data and navigation reference data provided by a flight management data source and the navigation reference data source, respectively. The takeoff distance symbology comprises a far end and a near end, where the location of the far end corresponds to a location of the end of the assigned runway, and the location of the near end is dependent upon the location of the far end, the direction of the runway opposite of the assigned runway, and the takeoff distance. The takeoff distance symbology may be presented as a superimposition against an image of the assigned runway presented on the screen of the display unit.

20 Claims, 5 Drawing Sheets

SYSTEM, MODULE, AND METHOD FOR PRESENTING SURFACE SYMBOLOGY ON AN AIRCRAFT DISPLAY UNIT

BACKGROUND OF THE INVENTION

1. Field of the Invention

This invention pertains generally to the field of aircraft display units that provide information to the pilot or flight crew of an aircraft.

2. Description of the Related Art

The savings of time and/or costs are important to operators of aircraft. Operating an aircraft is not inexpensive, and a main cost of powered aircraft is fuel. If the operator can save time while operating an aircraft, then he or she might be able to save money. If the operator is able to shorten the taxi distance prior to takeoff, then he or she can reduce the amount of time.

Occasionally, at airports with relatively long runways, there may come a time in which the pilot does not need to taxi the aircraft to the end of the runway to perform a safe takeoff. Instead, a mid-field takeoff may be available if the pilot is aware of how much distance is available on the takeoff runway. When available, this offers an opportunity to save both time and fuel costs. The opportunity to reduce airport congestion may become available where an aircraft can takeoff sooner from a mid-field location.

In order to take advantage of this opportunity, the pilot will need to monitor the location of his or her aircraft position in relation to the takeoff runway and/or monitor how much runway distance is available from the aircraft's current location. This could force the pilot to make instant estimates about the aircraft's current location and the distance from such estimated location to the end of the runway in order to decide at that time whether there is a sufficient amount of remaining runway to perform a safe takeoff.

BRIEF SUMMARY OF THE INVENTION

The embodiments disclosed herein present at least one novel and non-trivial system, module, and method for presenting surface symbology indicative of takeoff distance on an aircraft display unit, where such takeoff distance symbology is referenced from the end of the runway. The use of symbology may be used to enhance a pilot's situational awareness of the airport surface environment by enabling him or her with the ability to perform a safe, mid-field takeoff without having to make an instantaneous estimate of aircraft location and/or runway distance available for takeoff.

In one embodiment, a system is disclosed for presenting surface symbology on an aircraft display unit. The system could comprise a flight management data source for providing the assigned runway and takeoff distance; a navigation reference data source for providing assigned runway information and/or opposing runway information; a symbology generator, and a display unit. The symbology generator could generate symbology image data based upon the flight management data and the navigation reference data, and then provide such symbology image data to a display unit for displaying the image represented in the symbology image data. Such symbology image data could represent an image depicting a takeoff distance symbology comprised of a far end and a near end. The location of the far end could correspond to a location of the end of the assigned runway, and the location of the near end could depend upon the location of the far end, the direction of the runway opposite of the assigned runway, and the takeoff distance. The end of the assigned runway could be, for example, the landing threshold of the opposing runway. After generation, the symbology image data could be provided to a display unit, whereby the takeoff distance symbology is presented on the screen of the display unit. In an additional embodiment, navigation data could be provided to the symbology generator, such that visual appearance of the takeoff distance symbology may be based upon the aircraft location in relation to the assigned runway. In an additional embodiment, the symbology generator and the display unit may be integrated into a portable device.

In another embodiment, a module is disclosed for presenting surface symbology on an aircraft display unit. The module could comprise input communications and output communications interfaces and a symbology generator, where each interface facilitates the transfer of data to and from the symbology generator. After receiving flight management data and navigation reference data from applicable source(s) via the input communications interface, the symbology generator could generate symbology image data representative of an image depicting a takeoff distance symbology comprised of a far end and a near end, where the locations of the far and near ends are determined as described above. In an additional embodiment, navigation data could be received by the symbology generator via the input communications interface, such that visual appearance of the takeoff distance symbology may be based upon the aircraft location in relation to the assigned runway. In an additional embodiment, the module may be integrated into a portable device.

In another embodiment, a method is disclosed for presenting surface symbology on an aircraft display unit. Flight management data and navigation reference data could be received, symbology image data representative of an image depicting a takeoff distance symbology could be generated, and the symbology image data could be provided to a display unit for displaying takeoff distance symbology represented in the symbology image data as described above. In an additional embodiment, navigation data could be received and included in the generation of the symbology image data, such that visual appearance of the takeoff distance symbology may be based upon the aircraft location in relation to the assigned runway.

Figure 3A:
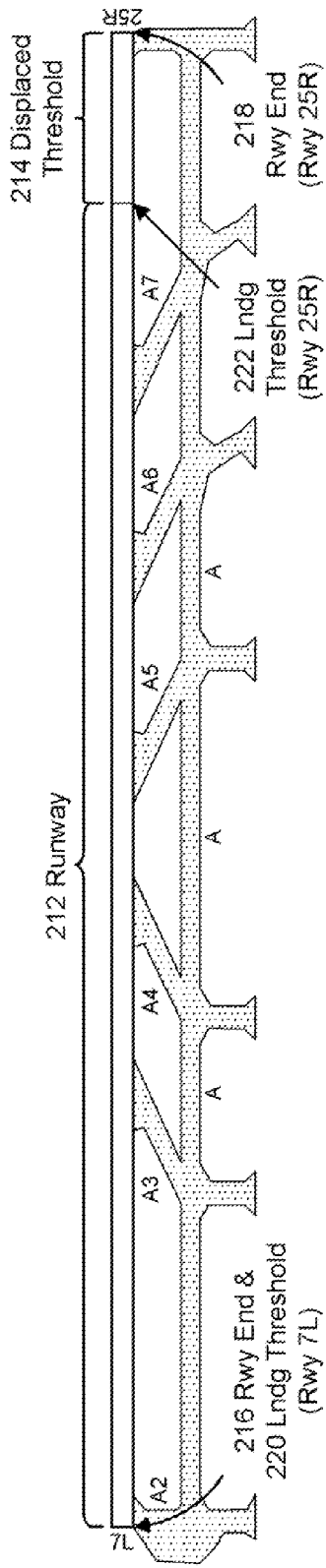

The drawings of FIG. 3 illustrate takeoff distance symbologies for improving a pilot's situational awareness while contemplating a takeoff on an assigned runway or taxiing to the assigned runway for takeoff.

Figure 4:
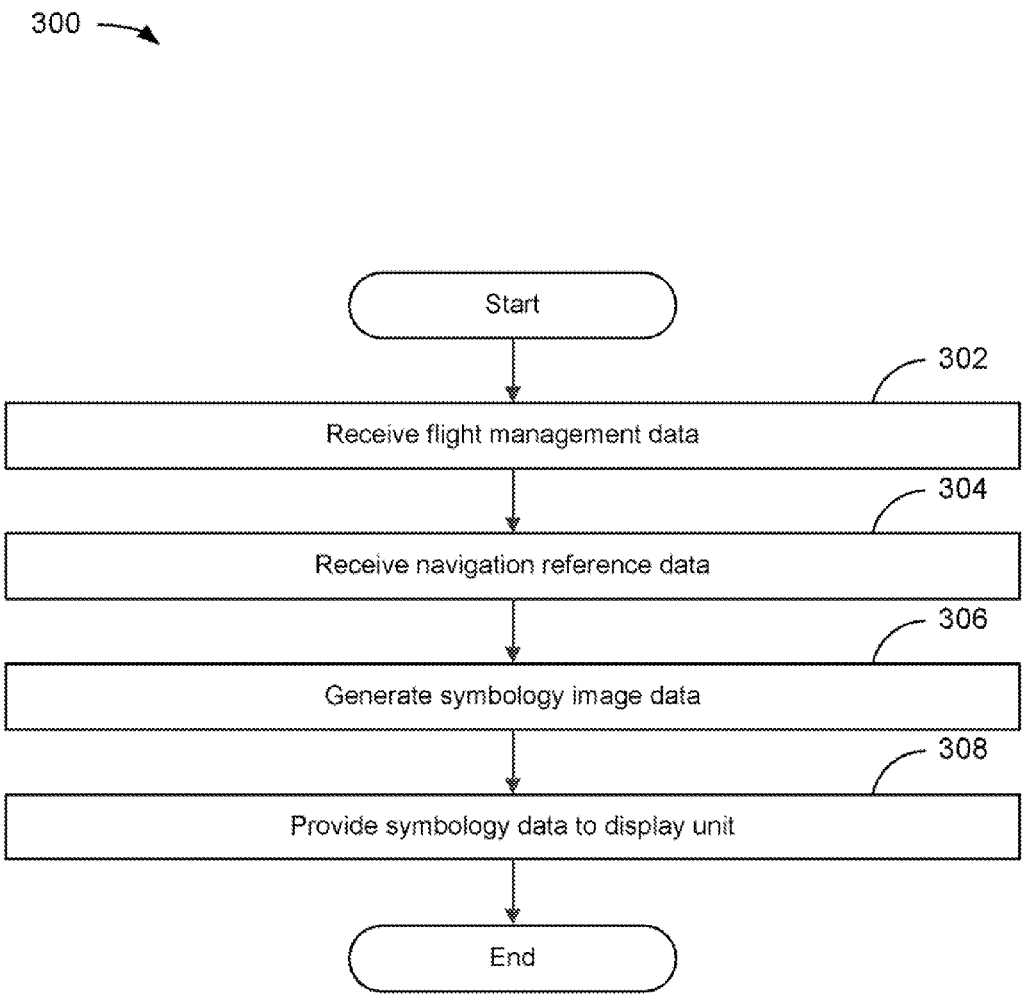

FIG. 4 depicts a flowchart of a method for presenting airport surface symbology on an aircraft display unit.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
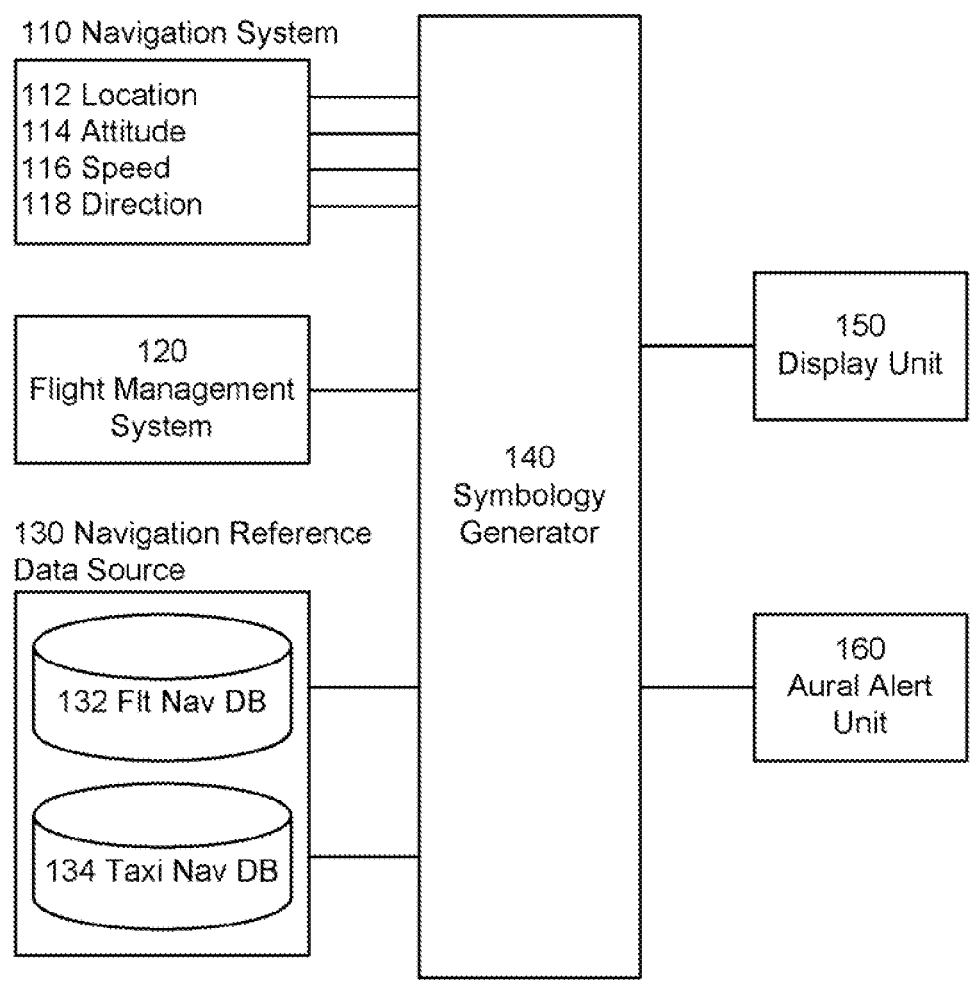
FIG. 1 depicts a block diagram of an airport surface symbology presentation system.

FIG. 1 depicts a block diagram of a surface symbology presentation system 100 suitable for implementation of the techniques described herein. The surface symbology presentation system 100 of an embodiment of FIG. 1 includes navigation system 110, a flight management system ("FMS") 120, a navigation reference data source 130, a symbology generator ("SG") 140, a display unit 150, and an aural alerting unit 160.

In an embodiment of FIG. 1, the navigation system 110 comprises the system or systems that could provide navigation data information in an aircraft. It should be noted that data, as embodied herein for any source or system in an aircraft, could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles.

The navigation system 110 may include, but is not limited to, an air/data system, an attitude heading reference system, an inertial guidance system (or inertial reference system), a radio navigation system, and a global navigation satellite system (or satellite navigation system), all of which are known to those skilled in the art. As embodied herein, the navigation system 110 could provide navigation data including, but not limited to, aircraft location 112 (e.g., latitude and longitude location of the aircraft), attitude 114, speed 116, and direction 118. As embodied herein, aircraft location 112 could include altitude information, and direction 118 may be derived from location information. Also, aircraft location 112 is synonymous and/or interchangeable with ownship location 112. As embodied herein, navigation data may be provided to the SG 140 for subsequent processing as discussed herein.

In an embodiment of FIG. 1, the FMS 120 may perform a variety of functions performed to help the crew in the management of the flight; these functions are known to those skilled in the art. These functions could include receiving assigned runway information and providing such information to the SG 140 as discussed below. Additionally, the FMS 120 could compute a variety of distances, but not limited to, a takeoff distance based upon one or more data provided to the EMS 120 automatically and/or through pilot input. Alternatively, the takeoff distance could be computed by the pilot and entered into the FMS 120. As embodied herein, data representative of flight management information may be provided by the FMS 120 to the SG 140 for subsequent processing as discussed herein.

The FMS 120 may also be a source of navigation reference data. In an embodiment of FIG. 1, the navigation reference data source 130 could comprise any source of airport surface data including, but is not limited to, a flight navigation database 132 and/or a taxi navigation database 134.

The flight navigation database 132 may contain records which provide runway data. The flight navigation database 132 could contain navigation reference data representative of information associated with, but not limited to, airport and airport surfaces including runways and taxiways. As embodied herein, the FMS 120 could employ the flight navigation database 132.

The taxi navigation database 134, such as one described by Krenz et al in U.S. Pat. No. 7,974,773, may be used to store airport data that may be comprised of, in part, airport surfaces and airport visual aids. Airport surfaces include, but are not limited to, locations and information delineating or defining locations of runways, taxiways, and apron areas, fixed based operators ("FBOs"), terminals, and other airport facilities. Airport visual aids include, but are not limited to, airport pavement markings, runway markings, taxiway markings, holding position markings, airport signs, mandatory instruction signs, location signs, direction signs, destination signs, information signs, and runway distance remaining signs.

The taxi navigation database 134 could comprise an aerodrome mapping database ("AMDB") as described in the following document published by RICA, Incorporated: RTCA DO-272A entitled "User Requirements for Aerodrome Mapping Information." RTCA DO-272A provides for aerodrome surface mapping requirements for aeronautical uses particularly on-board aircraft. It should be noted that any standards are subject to change. Those skilled in the art appreciate that standards in the aviation industry including, but not limited to, RTCA DO-272A may be subject to change with future amendments or revisions and/or that other standards related to the subject matter may be adopted. The disclosures herein are flexible enough to include such future changes and/or adoptions of aviation standards. As embodied herein, the navigation reference data source 130 could provide runway data to the SG 140 for subsequent processing as discussed herein.

In an embodiment of FIG. 1, the SG 140 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The SG 140 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing units. As embodied herein, the SG 140 could be a processor(s) used by or in conjunction with any other system of the aircraft including, but not limited to, a processor(s) associated with the navigation system 110, the FMS 120, and a display unit 150 which could include a vision system such as, but not limited to, a synthetic vision system ("SVS"), an enhanced vision system ("EVS"), a combined SVS-EVS, or any combination thereof; for example, the SG 140 in FIG. 1, although depicted separately, could be included or made part of the display unit 150.

The SG 140 may be programmed or configured to receive as input data representative of information obtained from various systems and/or sources including, but not limited to, the navigation system 110, the FMS 120, and/or the navigation reference data source 130. As embodied herein, the terms "programmed" and "configured" are synonymous. The SG 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The SG 140 may be programmed or configured to execute the method discussed in detail below. The SG 140 may be programmed or configured to provide output data to various systems and/or units including, but not limited to, the display unit 150. The SG 140 may be electronically coupled to the display unit 150 to facilitate the providing of output data.

In an embodiment of FIG. 1, the display unit 150 could comprise any unit which presents symbolic information related to airport surfaces. In one embodiment herein, the display unit 150 could be configured to display an airport surface map ("ASM") on which a moving map or stationary map is displayed. The ASM may depict ownship position on an airport surface, where ownship may be considered the aircraft in which the display unit is installed. Ownship position may be determined from location data provided by the navigation system 110, and airport surfaces may be determined from data provided by the navigation reference data source 130 using the position data. The amount of airport surface information displayed could depend upon a range selected by the pilot, where such range could depend on the amount of information with which he or she wants to be presented. As embodied herein, the ASM may be used in conjunction with one or more aircraft systems such as an Automatic Dependent Surveillance-Broadcast ("ADS-B") system and/or a Traffic Information Service-Broadcast ("TIS-B") system to enhance the situational awareness of other traffic on the ground by presenting the position of other traffic on the ASM in relation to ownship. As embodied herein, the display unit 150 could comprise a portable device, including but not limited to, a handheld device configured for receiving data from one or more sources of data discussed above and processing such data as discussed below.

In an embodiment of FIG. 1, the aural alerting unit 160 may be any unit capable of producing aural alerts. Aural alerts may be discrete sounds, tones, and/or verbal statements used to annunciate a condition, situation, or event that may require the presentation of a caution or warning alert to the pilot. Caution alerts may be alerts requiring immediate crew awareness and subsequent flight crew response, whereas warning alerts may be alerts requiring immediate crew action. In one embodiment, an aural alert could call out "CAUTION—TAKEOFF DISTANCE" when the conditions for a caution alert have been met or "WARNING—TAKEOFF DISTANCE" when the conditions for a warning alert have been met, and either or both could be accompanied with tonal indicators. As embodied herein, both caution and warning aural alerts could be called out in combination with or simultaneous to takeoff distance symbology.

Figure 2A:
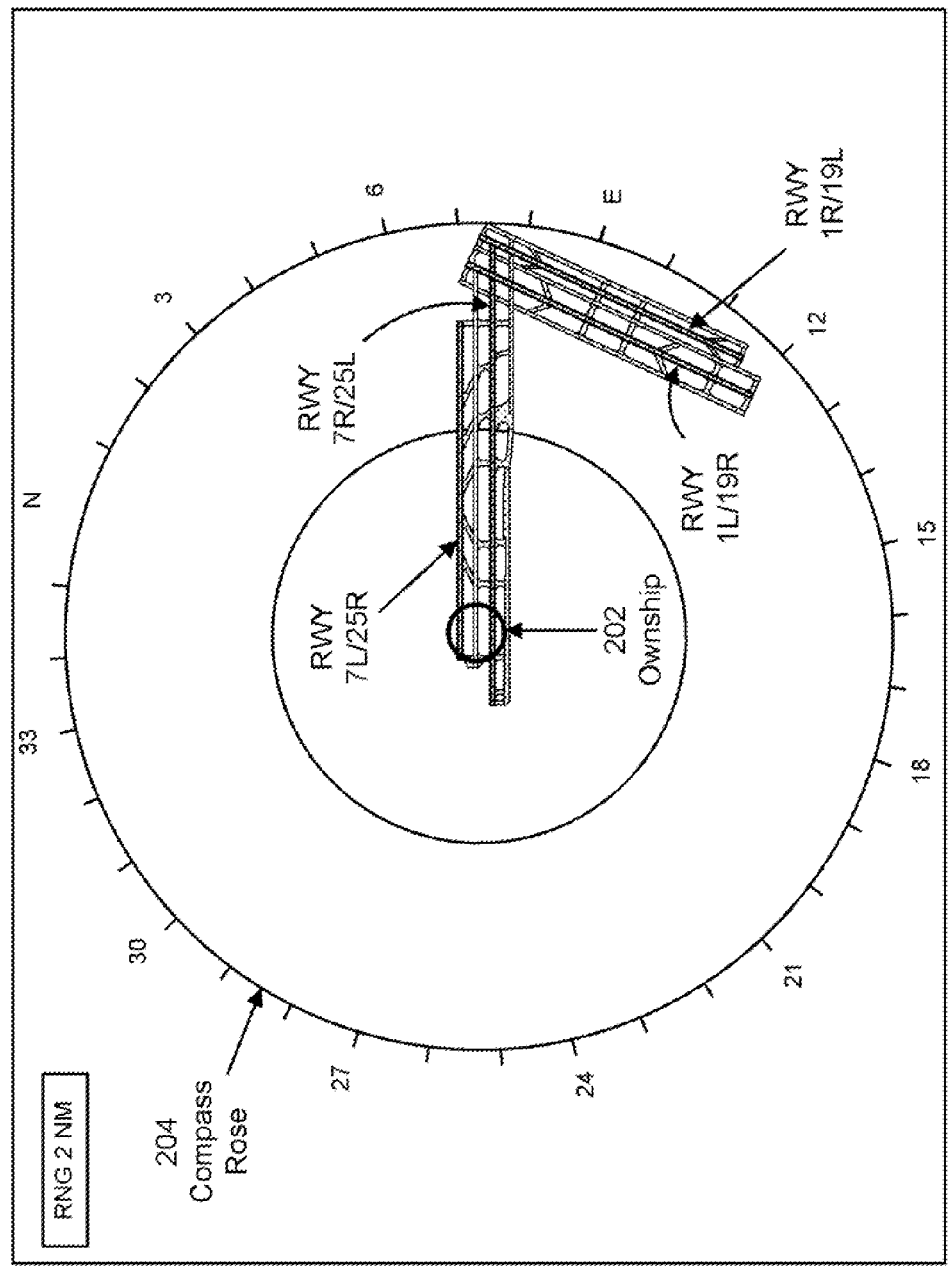
FIG. 2A depicts an exemplary illustration of taxiways, runways, and position of ownship on an Airport Surface Map ("ASM") presented on a display unit.

The drawings of FIG. 2 depict an ASM for providing an exemplary illustration of ownship and airport surfaces that may be depicted on the display unit 150. FIG. 2A depicts the position of ownship 202 in relation to taxiways and runways, where the runways have been identified as the following: RWY 7L/25R, RWY 7R/25L, RWY 1R/19L, and RWY 1L/19R. For the purpose of illustration and not limitation, symbology that is representing ownship 202 is depicted as a circle in FIG. 2; those skilled in the art know that the symbology for depicting ownship 202 and any other symbology and/or information depicted on an ASM may be configurable by a manufacturer and/or end-user. As illustrated in FIG. 2A, the amount of surface information provided by the ASM corresponds to a range ("RNG") of 2 nautical miles ("NM"), and a compass rose 204 provides the pilot with the direction of the aircraft. The compass rose 204 may also provide a scale of the range; as shown in FIG. 2, the radius of the compass rose 204 is assumed to equal 2 NM.

Figure 2B:
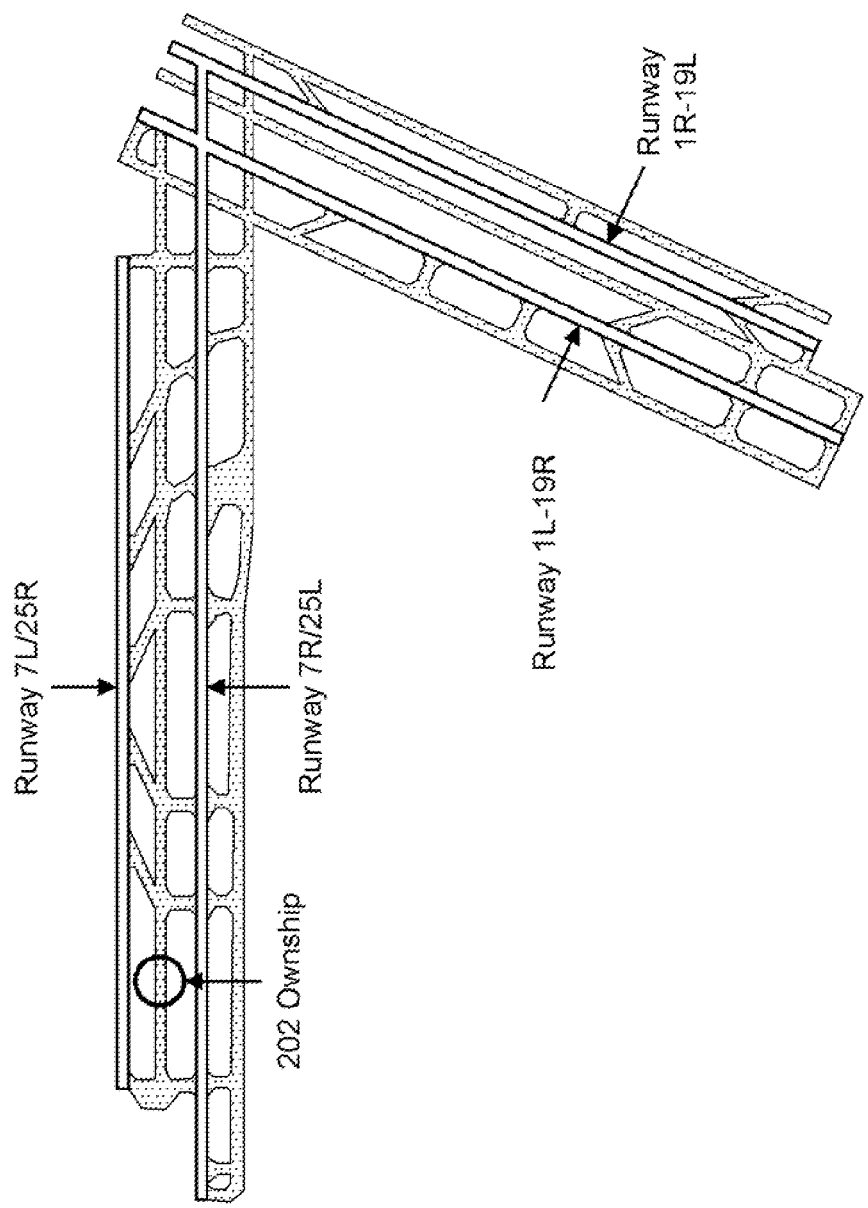
FIG. 2B depicts the taxiways, runways, and position of ownship of FIG. 2A without the display unit.

FIG. 2B illustrates the taxiways, runways, and position of ownship 202 of FIG. 2A. As shown in FIG. 2B, ownship 202 is located on a taxiway in between and parallel to RWY 7L/25R and RWY 7R/25L.

The advantages and benefits of the embodiments discussed herein may be illustrated by showing examples in the drawings of FIG. 3 of a surface symbology to improve a pilot's situational awareness while contemplating a takeoff on an assigned runway or taxiing to the assigned runway for takeoff. The drawings of FIG. 3 illustrate RWY 7L/25R and the parallel taxiway in between RWY 7L/25R and RWY 7R/25L as shown in the drawings of FIG. 2; as shown in the drawings, the parallel taxiway is identified as Taxiway A.

Those skilled in the art understand that a runway may be comprised of one or more defined sections including, but not limited to, a runway surface, a displaced threshold, a blast pad, and/or stopway. In an embodiment of FIG. 3A, RWY 7L/25R is comprised of a runway surface 212 and a displaced threshold 214 that is located between runway end 216 and runway end 218. The runway end 216 marks the beginning of RWY 7L and the end of RWY 25R, and the runway end 218 marks the beginning of RWY 25R and the end of RWY 7L. Additionally, there is a landing threshold 220 for RWY 7L and a landing threshold 222 for RWY 25R, where the landing threshold 220 has been assumed, for the purpose of illustration and not limitation, to coincide with the runway end 216.

Generally, the runway surface 212 may be used for both takeoffs and landings in both directions, and the displaced threshold 214 may be used for takeoffs in both directions and landing rollouts on RWY 7L; however, the displaced threshold 214 may not be used for landings on RWY 25R.

Figure 3B:
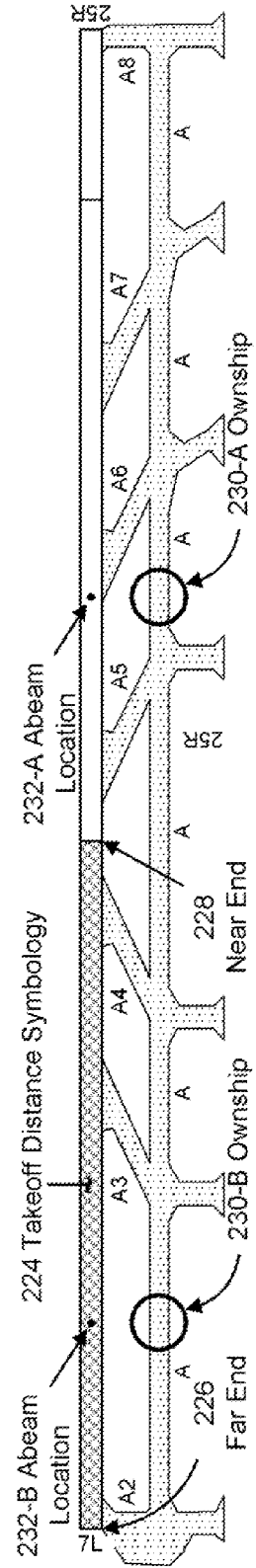
Figure 3C:
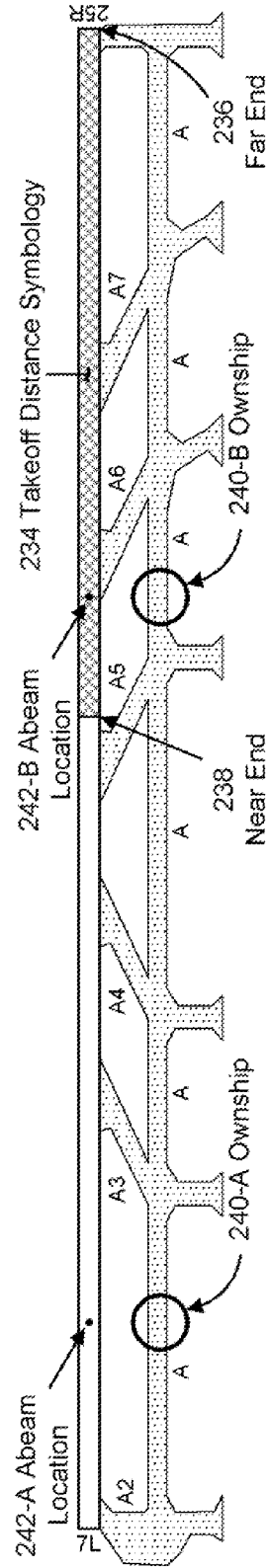

In the embodiments of FIGS. 3B and 3C, graphical objects are used for depicting takeoff distance symbologies 224 and 234 are disclosed. For the purposes of illustration and discussion only, the takeoff distance symbologies 224 and 234 are shown as a rectangle filled with cross-hatching. As disclosed herein, the placement of each may be dependent upon the assigned runway, takeoff distance, and location of the runway end of the assigned runway. As discussed above, data representative of the assigned runway and takeoff distance may be provided by the FMS 120, and data representative of runway information associated with assigned runway may be provided by the navigation reference data source 130, where such runway information may include, but is not limited to, the location of the runway end of the assigned runway and/or the direction of the runway opposite of the assigned runway ("opposing runway").

In an embodiment of FIG. 3B, the assigned runway is RWY 25R and the opposing runway is RWY 7L. As illustrated, the takeoff distance symbology 224 is comprised of a far end 226 and a near end 228. As embodied herein, the far end 226 may be determined using runway information, where such runway information could correspond to the location of the runway end 216 and/or landing threshold 220 of the opposing runway. Once the location of the far end 226 has been determined, the location of the near end 228 may be determined using the takeoff distance and runway information, where the distance between the far end 226 and the near end 228 could correspond to the takeoff distance, and the direction from the far end 226 could correspond to the direction of the opposing runway.

In an embodiment of FIG. 3C, the assigned runway is RWY 7L and the opposing runway is RWY 25R. As illustrated, the takeoff distance symbology 234 is comprised of a far end 236 and a near end 238. As embodied herein, the far end 236 may be determined using runway information, where such runway information could correspond to the location of the runway end 218. Once the location of the far end 236 has been determined, the location of the near end 238 may be determined using the takeoff distance and runway information, where the distance between the far end 236 and the near end 238 could correspond to the takeoff distance, and the direction from the far end 236 could correspond to the direction of the opposing runway.

It should be noted that by simply looking at the information presented in the illustrations of FIGS. 3B and 3C, the pilot is instantly informed from which taxiway a mid-field takeoff may be safely performed. From the graphical information shown in FIG. 3B, the pilot may safely perform a mid-field takeoff on RWY 25R from taxiways A5, A6, and/or A7; from FIG. 3C, a mid-filed takeoff may be safely performed on RWY 7L from taxiways A3, A4, and/or A5.

The takeoff distance symbology 224 or 234 may be configured with enhancing effects such as, but not limited to, shading, transparency, translucency, opacity, texture-mapping, bump-mapping, fogging, shadowing, patterns, colors, or any combination thereof. For example, they could be enhanced by color and/or intermittent flashing, where the configuration of such color and/or flashing could depend on the location of ownship 230 or ownship 240 in relation to the assigned runway as illustrated in FIGS. 3B and 3C. As discussed above, ownship location 112 may be provided by a navigation system 110.

The following examples illustrate how the appearance of the takeoff distance symbology 224 or 234 may change in relation to ownship location 112. For example, assume that the assigned runway is RWY 25R. In FIG. 3B, the distance in between the location of the runway end 216 and a location 232-A on the runway surface abeam of ownship 230-A is greater than the takeoff distance. Here, the takeoff distance symbology 224 could be configured to present a steady green color, thereby advising the pilot with a real-time, instant indication that ownship is able to safely takeoff on RWY 25R from its current location.

In a similar example, assume that the assigned runway is RWY 7L. In FIG. 3C, the distance in between the location of the runway end 218 and a location 242-A on the runway surface 212 abeam of ownship 240-A is greater than the takeoff distance. Here, the takeoff distance symbology 234 could be configured to present a steady green color, again advising the pilot with a real-time, instant indication that ownship is able to safely takeoff on RWY 7L from its current location.

In another example, assume that the assigned runway is RWY 25R. In FIG. 3B, if ownship 230-A enters taxiways A5, A6, A7, and/or A4, is located on one of these taxiways, and/or taxis onto the runway surface 212 from one of these taxiways, the takeoff distance symbology 224 could also be configured to present a steady green color.

In a similar example, assume that the assigned runway is RWY 7L. In FIG. 3C, if ownship 240-A enters taxiways A2, A3, A4, and/or A5, is located on one of these taxiways, and/or taxis onto the runway surface 212 from one of these taxiways, the takeoff distance symbology 234 could also be configured to present a steady green color.

In another example, assume that the assigned runway is RWY 25R. In FIG. 3B, the distance in between the location of the runway end 216 and a location 232-B on the runway surface 212 abeam of ownship 230-B is less than the takeoff distance. Here, the takeoff distance symbology 224 could be configured to present a steady and/or flashing amber color, thereby cautioning the pilot with a real-time, instant indication that ownship is not able to safely takeoff on RWY 25R from its current location. In another embodiment, an aural alert such as "CAUTION—TAKEOFF DISTANCE" could be called out in combination with or simultaneous to the presentation of the takeoff distance symbology 224.

In a similar example, assume that the assigned runway is RWY 7L. In FIG. 3C, the distance in between the location of the runway end 218 and a location 242-B on the runway surface 212 abeam of ownship 240-B is less than the takeoff distance. Here, the takeoff distance symbology 234 could be configured to present a steady and/or flashing amber color, again cautioning the pilot with a real-time, instant indication that ownship is not able to safely takeoff on RWY 7L from its current location. In another embodiment, an aural alert such as "CAUTION—TAKEOFF DISTANCE" could be called out in combination with or simultaneous to the presentation of the takeoff distance symbology 234.

In another example, assume that the assigned runway is RWY 25R. In FIG. 3B, if ownship enters taxiways A2, A3, and/or A4, is located on one of these taxiways, and/or taxis onto the runway surface 212 from one of these taxiways, the takeoff distance symbology 224 could also be configured to present a steady and/or flashing red color, thereby warning the pilot with a real-time, instant indication that ownship is not able to safely takeoff on RWY 25R from its current location. In another embodiment, an aural alert such as "WARNING—TAKEOFF DISTANCE" could be called out in combination with or simultaneous to the presentation of the takeoff distance symbology 224.

In a similar example, assume that the assigned runway is RWY 7L. In FIG. 3B, if ownship enters taxiways A6, A7, and/or A8, is located on one of these taxiways, and/or taxis onto the runway surface 212 from one of these taxiways, the takeoff distance symbology 234 could also be configured to present a steady and/or flashing red color, again warning the pilot with a real-time, instant indication that ownship is not able to safely takeoff on RWY 7L from its current location. In another embodiment, an aural alert such as "WARNING—TAKEOFF DISTANCE" could be called out in combination with or simultaneous to the presentation of the takeoff distance symbology 234.

Although each of the preceding examples discusses the enhancing effect of color and the possible occurrences which could trigger a different configuration of color, other enhancing effects could be employed and configured to change appearance upon the occurrence of a pre-defined event. It should be noted that the preceding examples are intended to illustrate the possible enhancing effects in which a manufacturer or end-user may configure the takeoff distance symbology, where the generation and usage of enhancing effects are known to those skilled in the art. These examples are not intended to provide a limitation or an exhaustive list to the embodiments discussed herein.

Additionally, it should be noted that, although the disclosed embodiments have been drawn to a display unit depicting a plan view of an ASM, they may be applied to a display unit depicting an egocentric view of a runway surface. In one embodiment, the display unit could comprise a PFD unit providing at least "basic T" information (i.e., airspeed, attitude, altitude, and heading) against the background of an image depicting a three-dimensional image of the scene outside the aircraft, where the image could be generated by a synthetic vision system. As embodied herein, the PFD unit could comprise a head-down display ("HDD") unit and/or a head-up display ("HUD") unit.

FIG. 4 depicts a flowchart 300 of an example of a method for presenting surface symbology on an aircraft display unit, where the SG 140 may be programmed or configured with instructions corresponding to the following modules. As embodied herein, the SG 140 may be a processor of an indicating system comprising one or more display units. Also, the SG 140 may be a processor of a module such as, but not limited to, a printed circuit card having one or more input interfaces to facilitate data communications with the SG 140, i.e., the receiving and providing of data. As necessary for the accomplishment of the following modules embodied in FIG. 4, the receiving of data is synonymous and/or interchangeable with the retrieval of data, and the providing of data is synonymous and/or interchangeable with the making available or supplying of data.

The method begins with module 302 with the receiving of flight management data from a source of such data such as the FMS 120, where such flight management data could comprise data representative of assigned runway information. The method continues with module 304 with the receiving of data navigation reference data from the navigation reference data source 130, where such data could comprise data representative of runway information associated with the assigned runway. As embodied herein, the source of flight management data and the source of navigation reference data could be comprised of the same source; that is, the FMS 120 could provide the source data for both flight management data and navigation reference data.

In one embodiment, runway information associated with the assigned runway may include information corresponding to the location of the runway landing threshold point, length, direction, displaced threshold, and/or stopway of the assigned runway. In another embodiment, runway information associated with the assigned runway may include information corresponding to the location of the runway landing threshold point, direction, displaced threshold, and/or stopway of the opposing runway. In another embodiment, runway information associated with the assigned runway may include information from both the assigned runway and the opposing runway.

In an additional embodiment, navigation data representative of aircraft location 112 (i.e., ownship location 112) may be received, where such data could be provided by a source of navigation data such as the navigation system 110. As embodied herein, navigation data could be provided from the FMS 120.

The method continues with module 306 with the generating of symbology image data based upon the flight management data and the navigation reference data representative of runway information associated with assigned runway. As embodied herein, the SG 140 may generate symbology image data representative of an image depicting takeoff distance symbology comprised of a far end and a near end.

The far end may be determined by the SG 140 using runway information corresponding to the location of the runway end. In one embodiment, a manufacturer and/or end-user could select the runway end to be a point determined from the information corresponding to the location of the runway landing threshold point, length, direction, displaced threshold, and/or stopway of the assigned runway. In another embodiment, a manufacturer and/or end-user could select the runway end to be a point determined from the information corresponding to the location of the runway landing threshold point, displaced threshold, and/or stopway of the opposing runway.

Once the location of the far end has been determined, the location of the near end may be determined by the SG 140 using the takeoff distance and runway information. The distance between the far end and the near end could correspond to the takeoff distance, and the direction from the far end could correspond to the direction of the opposing runway.

In an embodiment which receives navigation data, the visual appearance of the takeoff distance symbology could be based upon the aircraft location in relation to the assigned runway as discussed above. Also, if this embodiment includes the aural alert unit 160, the SG 140 could generate alert data based upon the aircraft location in relation to the assigned runway and provide an aural alert data to the aural alert unit; whereby an aural alert is presented to a pilot.

The method continues with module 308 with the providing of the symbology image data to one or more display units. When received by the display unit, the takeoff distance symbology may be presented to the pilot on the screen of the display unit. As embodied herein, the takeoff distance symbology may be superimposed (i.e., overlaid) on top of an image of the assigned runway by technique(s) known to those skilled in the art.

Each display unit may depict a different view of the image (s). In one embodiment, the image of at least the assigned runway may be depicted two-dimensionally as a plan view or an egocentric view on an airport surface map on an ASM. In another embodiment, the image of at least the assigned runway may be depicted egocentrically in a three-dimensional image of a scene outside the aircraft, where the three-dimensional image has been generated by an SVS, an EVS, or combined SVS-EVS. Then the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for presenting surface symbology on an aircraft display unit, said system comprising:
   a source for providing flight management data;
   a source for providing navigation reference data;
   a symbology generator configured to
      receive flight management data representative of an assigned runway and a takeoff distance of an aircraft, where
         the aircraft is not able to safely takeoff in a distance less than the takeoff distance,
      receive navigation reference data representative of the assigned runway, the runway opposite of the assigned runway, or both,
      generate symbology image data based upon the flight management data and the navigation reference data, where
         such symbology image data is representative of an image depicting takeoff distance symbology comprised of a far end and a near end, where
            the location of the far end corresponds to a location of the end of the assigned runway, and
            the location of the near end is dependent upon the location of the end of the assigned runway,
the direction of the runway opposite of the assigned runway, and
a measurement of the takeoff distance taken from the end of the assigned runway, and
provide the symbology image data to a display unit; and
the display unit for receiving the symbology image data, whereby
the takeoff distance symbology is presented on a screen of the display unit.

2. The system of claim 1, wherein a flight management system is
the source for providing flight management data,
the source for providing navigation reference data, or both.

3. The system of claim 1, wherein the symbology generator is integrated into the source for providing flight management data.

4. The system of claim 1, wherein the end of the assigned runway is the landing threshold of the runway opposite of the assigned runway.

5. The system of claim 1, wherein the takeoff distance symbology is presented as a superimposition
against a two-dimensional image of the assigned runway presented on the screen of the display unit,
against a three-dimensional image of the assigned runway presented on the screen of the display unit, or
both.

6. The system of claim 1, further comprising:
a source for providing navigation data, and
the symbology generator further configured to
receive navigation data representative of aircraft location, where
the basis for generating the symbology image data includes the navigation data, such that
the visual appearance of the takeoff distance symbology is based upon the aircraft location in relation to the assigned runway.

7. The system of claim 6, wherein the source for providing flight management data is the source for providing navigation data.

8. The system of claim 6, further comprising:
an aural alert unit, where
the symbology generator is further configured to
generate aural alert data based upon the aircraft location in relation to the assigned runway, and
provide the aural alert data to the aural alert unit; and
the aural alert unit for receiving the aural alert data, whereby an aural alert is presented to a pilot.

9. The system of claim 6, wherein the symbology generator and the display unit are integrated into a portable device.

10. A module for presenting surface symbology on an aircraft display unit, said module comprising:
an input communications interface to facilitate the receiving of data provided from at least one data source;
a symbology generator configured to
receive flight management data representative of an assigned runway and a takeoff distance of an aircraft, where
the aircraft is not able to safely takeoff in a distance less than the takeoff distance,
receive navigation reference data representative of the assigned runway, the runway opposite of the assigned runway, or both,
generate symbology image data based upon the flight management data and the navigation reference data, where
such symbology image data is representative of an image depicting takeoff distance symbology comprised of a far end and a near end, where
the location of the far end corresponds to a location of the end of the assigned runway, and
the location of the near end is dependent upon
the location of the end of the assigned runway,
the direction of the runway opposite of the assigned runway, and
a measurement of the takeoff distance taken from the end of the assigned runway, and
provide the symbology image data to an output communications interface to facilitate the providing of the symbology image data to a display unit, whereby
the takeoff distance symbology is subsequently presented on a screen of the display unit; and
the output communications interface.

11. The module of claim 10, wherein the end of the assigned runway is the landing threshold of the runway opposite of the assigned runway.

12. The module of claim 10, wherein the takeoff distance symbology is presented as a superimposition
against a two-dimensional image of the assigned runway presented on the screen of the display unit,
against a three-dimensional image of the assigned runway presented on the screen of the display unit, or
both.

13. The module of claim 10, wherein
the symbology generator is further configured to
receive navigation data representative of aircraft location, where the basis for generating the symbology image data includes the navigation data, such that
the visual appearance of the takeoff distance symbology is based upon the aircraft location in relation to the assigned runway.

14. The module of claim 13, wherein
the symbology generator is further configured to
generate aural alert data based upon the aircraft location in relation to the assigned runway, and
provide the aural alert data to the output communications interface to facilitate the providing of the aural alert data to an aural alert unit, whereby
an aural alert is subsequently presented to a pilot.

15. The module of claim 13, wherein such module is integrated into a portable device.

16. A method for presenting surface symbology on an aircraft display unit, said method comprising:
receiving flight management data representative of an assigned runway and a takeoff distance of an aircraft, where
the aircraft is not able to safely takeoff in a distance less than the takeoff distance;
receiving navigation reference data representative of the assigned runway, the runway opposite of the assigned runway, or both;
generating symbology image data based upon the flight management data and the navigation reference data, where
such symbology image data is representative of an image depicting takeoff distance symbology comprised of a far end and a near end, where
the location of the far end corresponds to a location of the end of the assigned runway, and
the location of the near end is dependent upon
the location of the end of the assigned runway,
the direction of the runway opposite of the assigned runway, and a measurement of the takeoff distance taken from the end of the assigned runway; and providing the symbology image data to a display unit, whereby the takeoff distance symbology is subsequently presented on a screen of the display unit.

17. The method of claim 16, wherein the end of the assigned runway is the landing threshold of the runway opposite of the assigned runway.

18. The method of claim 16, wherein the takeoff distance symbology is presented as a superimposition against a two-dimensional image of the assigned runway presented on the screen of the display unit, against a three-dimensional image of the assigned runway presented on the screen of the display unit, or both.

19. The method of claim 16, further comprising:

receiving navigation data representative of aircraft location, where the basis for generating the symbology image data includes the navigation data, such that the visual appearance of the takeoff distance symbology is based upon the aircraft location in relation to the assigned runway.

20. The method of claim 19, further comprising:

generating aural alert data based upon the aircraft location in relation to the assigned runway, and providing the aural alert data to an aural alert unit, whereby an aural alert is subsequently presented to a pilot.

\* \* \* \* \*